United States Patent Office 3,234,248
Patented Feb. 8, 1966

3,234,248
ESTERS OF CHLORALMONOFLUORACETAMIDES
Otto Scherer, Frankfurt am Main, and Hans Habicht, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Mar. 5, 1963, Ser. No. 262,824
Claims priority, application Germany, June 24, 1961, F 34,264
11 Claims. (Cl. 260—404)

This application is a continuation-in-part of our earlier application, Serial No. 204,047, filed June 21, 1962, and now abandoned.

It is known that monofluoracetamide is a systemically active insecticide, but also that its use entails considerable risks owing to its toxicity to warm-blooded animals.

Now, we have found that compounds of the general formula

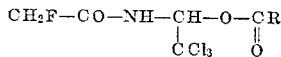

in which R is a saturated or monoolefinic unsaturated alkyl radical having 1–7 C-atoms, which may also be substituted by halogen or the —S—$C_2H_5$ group, or an aryl radical are equally active as systematic insecticides and contact insecticides and acaricides, but are considerably less toxic towards warm-blooded animals than the known compounds.

In order to be made up into pulverulent or liquid preparations suitable for use, the active substances of the present invention can be admixed with any of the auxiliary agents conventionally used for such purposes in this field. For example, they can be made up with wetting agents into so-called wettable powders which are then transformed into spray solutions shortly before use.

More particularly, the invention relates to the use of O-acetyl-chloralmonofluoracetamide and the analogous O-propionyl-, O-n-butyryl-, O-i-butyryl-, O-caprylyl-, O-crotonyl-, O-dimethylacrylyl-, O-benzoyl-, O-(ethylmercapto)-acetyl- and O-(2-chloropropionyl)-derivatives which correspond to the above-indicated formula.

The compounds to be used in accordance with the present invention can be obtained, for example, from the corresponding chloralmonofluoracetamide, which had been prepared in the usual manner, when exposing this compound to the action of the corresponding acid chloride. The reaction may be carried out in the presence of a solvent. As such a solvent there may be used one of the conventional solvents, for example, toluene, benzene, or petrol ether. The reaction is carried out at a temperature in the range of 50–150° C., preferably 100–130° C. The hydrochloric acid that forms thereby escapes in the form of a gas and may be bound, for example, with the aid of a tertiary base.

If no base is used, the O-acyl-compounds formed can directly be subjected to distillation under reduced pressure after removal of any solvent. If a base is used the O-acyl-compounds formed can be distilled under reduced pressure after filtration from the salt, subsequent washing and drying of the filtrate and removal of any solvent.

The reaction may also be carried out with the corresponding acid anhydride instead of the acid chloride.

The O-acyl derivatives so produced constitute colorless, sirupy, wax like or crystalline substances, which can be easily purified by distillation or recrystallization. They are thermostable and, provided the pressure is sufficiently reduced, they withstand distillation at temperatures of up to 180° C. without decomposition.

The corresponding not acylated compounds cannot be distilled without decomposition; they decompose already at much lower temperatures and with extensive formation of chloral.

In the following table, some of the new compounds are compared with the known fluoracetamide. In column 1 are indicated the designations of the compounds, in column 2 are given their boiling points and the respective pressures, in column 3 are given the melting points, and in column 4 the $LD_{50}$ p.o. in mg. of active substance per kg. of rat (albino rats). In column 5 are listed in the values of molar toxicity, obtained by division of the $LD_{50}$ of column 4 by the corresponding molecular weight. The LD values indicated are all higher than the corresponding value of monofluoracetamide.

TABLE

| 1 | 2 | 3 | 4 | 5 |
|---|---|---|---|---|
| Compound | Boiling point, °C./mm. | Melting point, °C. | $LD_{50}$ | Molar $LD_{50}$ |
| O-dimethylacrylyl-chloralmonofluoracetamide | 146–147/2.5 | 50–54 | 80–90 | 0.26–0.29 |
| O-acetyl-chloralmonofluoracetamide | 124–126/1.2 | 95–97 | 80–90 | 0.30–0.34 |
| O-propionyl-chloralmonofluoracetamide | 135–137/5 | 48–50 | 100 | 0.36 |
| O-n-butyryl-chloralmonofluoracetamide | 140–142/5 | 70–72 | 170–200 | 0.58–0.68 |
| O-i-butyryl-chloralmonofluoracetamide | 124–125/0.5 | 63–66 | 150–200 | 0.51–0.68 |
| O-benzoyl-chloralmonofluoracetamide | | 98–100 | 135 | 0.41 |
| O-crotonyl-chloralmonofluoracetamide | 135–140/0.4 | (¹) | 45 | 0.16 |
| O-n-caprylyl-chloralfluoracetamide | 146–150/1.5 | Oil | 135 | 0.39 |
| O-2-chloro-propionyl-chloralfluoracetamide | 144–148/0.2 | (¹) | 65 | 0.21 |
| O-(ethyl-mercapto)-acetyl-chloralfluoracetamide | 153–155/3.0 | Oil | 70 | 0.22 |
| Monofluoracetamide | 120/52 | 108 | 15 | 0.19 |

¹ Oil, solidifies.

The following examples illustrate the invention, but they are not intended to limit it thereto:

Example 1

224.5 g. (1 mol) of chloralfluoracetamide, 140 g. (1.2 mol) of dimethylacrylic acid chloride and 200 cc. of toluene are refluxed, which proceeds at about 120° C., for so long until the quantity of escaping hydrogen chloride gas is but small. This requires approximately 3 hours. After having removed the toluene and the excess acid chloride by distillation under reduced pressure, the remaining oil is also subjected to distillation.

The product of the invention passes over at a temperature in the range of 148–150° C. and a pressure of 1.5 mm. Hg in the form of a colorless sirup which solidifies after a short time to yield a wax-like mass. 246 g. (80% of the theoretical yield) are thus obtained.

Example 2

Larvae of ticks of the genus *Ornithodorus moubata*, which were placed in glass dishes coated with filter paper that had been sprayed with 1.5 cc. of a spray liquor containing 0.3% of O-dimethylacrylyl-chloralmonofluoracetamide as the active substance, died after a few hours.

Example 3

Cockroaches of the genus *Periplaneta americana* which were placed in Petri dishes coated with filter paper that had been treated with 1.5 cc. of a spray liquor containing 1.2% of O-dimethylacrylyl-chloralmonofluoracetamide as the active substance were completely destroyed.

Example 4

Plants of the variety *Vicia faba* infested with plant-lice of the genus *Doralis fabae* were sprayed with an aqueous solution of 0.4% strength of a preparation consisting of 30% of O-dimethylacrylyl-chloralmonofluoracetamide, 50% of cyclohexanone, and 20% of nonylphenol; this treatment killed all the plant-lice.

Example 5

The same effect on plant-lice was produced when using instead of O-dimethylacrylyl-chloralmonofluoracetamide one of the following derivatives:

O-crotonyl-chloralmonofluoracetamide
O-acetyl-chloralmonofluoracetamide
O-propionyl-chloralmonofluoracetamide
O-n-butyryl-chloralmonofluoracetamide
O-i-butyryl-chloralmonofluoracetamide
O-benzoyl-chloralmonofluoracetamide.

Example 6

A powder containing 10% of O-acetyl-chloralmonofluoracetamide as the active substance and 90% of a filler substance in the form of talc, applied at a rate of 0.6 kg./sq. m., effectively combatted *Periplaneta americana* (100% success).

Example 7

Polyester fibres that had been cut to short pieces were placed in a glass dish and the dish was then sprayed with 1.5 cc. of a spray liquor containing 0.4% of O-acetyl-chloralmonofluoracetamide. After the sprayed liquor had dried, older larvae of ticks were placed into the dish, at a temperature of $+35°$ C. All of these larvae were destroyed after a few days.

Example 8

The same effect on ticks could be produced with O-isobutyryl-chloralmonofluoracetamide as the active substance.

Example 9

The systemic properties of all afore-mentioned active substances could be proven by the following test:

Stems of plants infested with plant-lice, for example, *Vicia faba* with *Doralis fabae*, were provided, 1–2 cm. above ground, with a bandage of cotton-wool and covered with cellulose glass, the bandage having been impregnated with a 0.1% solution of a concentrate of 30% strength of the active substance to be tested, 50% of cyclohexanone, and 20% of nonylphenol.

Example 10

When plants of the variety *Vicia faba* infested with plant-lice of the genus *Doralis fabae* were sprayed with an aqueous solution of 0.1% strength of a preparation consisting of 15% of O-(ethyl-mercapto)-acetyl-chloralmonofluoracetamide as the active substance and, as inert substances, 64% of active silicic acid, 10% of cell pitch and 1% of oleic acid methyl tauride, all plant-lice were killed already after a few hours.

The same compound with the above formulation, but applied at an application rate of 0.7% of formulated product, proved very active against ticks of the genus *Ornithodorus moubata* which were all killed.

Example 11

The same effect against plant-lice as described in Example 10 was obtained with a 0.05% dilution of a preparation containing 15% of O-2-chloro-propionyl-monofluoracetamide as the active substance.

For killing ticks of the genus *Ornithodorus moubata*, the corresponding application rate of the same formulation was 1.2%.

Example 12

The systemical insecticidal properties of O-crotonyl-chloral-monofluoracetamide or of O-n-caprylyl-chloral-monofluoracetamide could be proved by the following tests:

Stems of plants of the variety *Vicia faba* infested with plant-lice were provided at their lower part with a bandage of cotton-wool and covered with cellulose glass; the cotton-wool containing 1 mg. of the respective active substance in fine distribution. All the plant-lice sucking on the upper parts of the plants were killed within 3 days by each of the above-indicated compounds.

We claim:

1. Compounds of the formula $$CH_2F-CO-NH-CH-O-CR$$
$$\phantom{CH_2F-CO-NH-}|\phantom{CH-O-}\|$$
$$\phantom{CH_2F-CO-NH-}CCl_3\phantom{CH}O$$

in which R is a member of the group consisting of saturated and monoolefinic alkyl groups having 1–7 C-atoms and their chlorine and $-S-C_2H_5$ substituted derivatives, and phenyl.

2. O-dimethylacrylyl-chloralmonofluoracetamide.
3. O-acetyl-chloralmonofluoracetamide.
4. O-propionyl-chloralmonofluoracetamide.
5. O-n-butyryl-chloralmonofluoracetamide.
6. O-i-butyryl-chloralmonofluoracetamide.
7. O-benzoyl-chloralmonofluoracetamide.
8. O-crotonyl-chloralmonofluoracetamide.
9. O-n-caprylyl-chloralfluoracetamide.
10. O-2-chloropropionyl-chloralfluoracetamide.
11. O-(ethyl-mercapto)-acetyl-chloralfluoracetamide.

References Cited by the Examiner

UNITED STATES PATENTS

| | | | |
|---|---|---|---|
| 2,268,206 | 12/1941 | Epstein et al. | 260—404 X |
| 2,357,078 | 8/1944 | Brown | 167—22 |
| 2,477,346 | 7/1949 | Pik | 260—404 |
| 2,514,376 | 7/1950 | Crooks | 260—490 |
| 2,831,018 | 4/1958 | Trieschmann et al. | 260—490 |
| 2,834,792 | 5/1958 | Wilkinson et al. | 260—490 |
| 2,898,265 | 8/1959 | Wegler | 167—30 |

CHARLES B. PARKER, *Primary Examiner.*